United States Patent [19]

Saito et al.

[11] Patent Number: 4,846,948
[45] Date of Patent: Jul. 11, 1989

[54] METHOD OF PRODUCING MAGNETIC FILMS OF FE-SI-AL ALLOY

[75] Inventors: Kazuhiro Saito; Taiichi Mori, both of Toda, Japan

[73] Assignee: Nippon Mining Company, Limited, Tokyo, Japan

[21] Appl. No.: 117,584

[22] Filed: Nov. 5, 1987

Related U.S. Application Data

[62] Division of Ser. No. 915,299, Oct. 3, 1986.

[30] Foreign Application Priority Data

Oct. 7, 1985 [JP] Japan ................. 60-223415

[51] Int. Cl.$^4$ .............................. C23C 14/34
[52] U.S. Cl. ..................... 204/192.2; 204/192.15
[58] Field of Search ............ 204/192.12, 192.15, 204/192.2, 192.23, 192.3, 298

[56] References Cited

U.S. PATENT DOCUMENTS

| | | | |
|---|---|---|---|
| 4,324,631 | 4/1982 | Meckel et al. | 204/192.2 |
| 4,525,262 | 6/1985 | Class et al. | 204/298 X |
| 4,559,572 | 12/1985 | Kumasaka et al. | 360/110 |
| 4,631,613 | 12/1986 | French | 360/125 |
| 4,670,972 | 6/1987 | Sahakima | 204/192.2 X |
| 4,705,613 | 11/1987 | French | 204/192.2 |

FOREIGN PATENT DOCUMENTS

| | | |
|---|---|---|
| 58-841479 | 11/1983 | Japan . |
| 0215013 | 12/1983 | Japan ................. 204/192.2 |
| 59-140622 | 8/1984 | Japan . |
| 60-7605 | 1/1985 | Japan . |

OTHER PUBLICATIONS

Homma et al., "Planar Dep. . . . R. F. Bias", J. Electrochem. Soc., Jun. 1985, pp. 1466–1472.

Primary Examiner—Nam X. Nguyen
Attorney, Agent, or Firm—Seidel, Gonda, Lavorgna & Monaco

[57] ABSTRACT

A method of producing a magnetic film of Fe-Si-Al alloy in which argon is entrapped, by using a DC magnetron sputtering apparatus to apply RF bias to a substrate thereby depositing a Fe-Si-Al alloy film on the substrate. The alloy film produced has a thermal expansion coefficient of $110 \times 10^{-7}$ to $170 \times 10^{-7}\,°C.^{-1}$ and the substrate has a thermal expansion coefficient of $100 \times 10^{-7}$ to $135 \times 10^{-7}\,°C.^{-1}$. The amount of argon entrapped in the alloy film is controlled within the range of 0.01 o 0.3 weight percent so as to substantially zero the internal stresses in the alloy film.

3 Claims, 3 Drawing Sheets

METHOD OF PRODUCING MAGNETIC FILMS OF FE-SI-AL ALLOY

This is a divisional of co-pending application Ser. No. 915,299 filed on Oct. 3, 1986, pending.

TECHNICAL FIELD

This invention generally relates to films of Fe-Si-Al Alloy, and particularly to magnetic films of such alloy having internal stresses substantially zeroed and providing excellent magnetic properties, and a method of producing the same. Such magnetic films of Fe-Si-Al alloy are suitable for use as magnetic cores for high density recording heads for high frequency use requiring a high S/N ratio, such as thin-film laminated magnetic heads used primarily as VCR and disk files and the like.

BACKGROUND ART

With a recent marked improvement in the recording density in the field of magnetic recording, there have been increased needs for reduction in the track width for magnetic heads serving as an electromagnetic transducer element, intensified saturation magnetization of core materials, and improvement in permeability in the high frequency range of core materials.

Core members for a magnetic head have heretofore been fabricated by cutting ferrite or Fe-Si-Al material into a block and forming the block with grooves 3 for defining the track width 2 and grooves 4 for receiving coil windings by the use of a dicing blade saw or the like, as shown in FIG. 5. However, in order to fabricate magnetic heads having narrow tracks less than 30μm wide, it is required to narrow the spacings of the grooves 3 for defining the track width to extremely small dimensions, with the result that problems have arisen of lack of precision of the track width 2 and irregularities in shape due to chipping in the portions of the track width 2.

On the other hand, for metallic magnetic thin film heads comprising metallic magnetic thin films such as conventional Fe-Si-Al alloy, such magnetic materials have been utilized which are laminated to a predetermined film thickness by stacking such metallic magnetic films 3 to 10 μm thick and non-magnetic insulation films about 0.5 μm thick in alternating relation.

More specifically, in manufacturing such metallic magnetic thin-film head, the laminated magnetic material may be fabricated by sputtering films on a substrate to a thickness corresponding to the track width wherein the process for defining the track width is eliminated, whereby the problems involved in fabricating magnetic heads from a block-type core material as described above may be resolved.

However, it has been found through researches and experiments conducted by the present inventors that metallic magnetic films formed by sputtering have quite high internal stresses and that the laminated metal thin-film magnetic head made from such multi-layered magnetic material composed of metallic magnetic films, that is, magnetic core layers exhibits poor magnetic properties due to magnetostriction. More specifically, it has been found that such magnetostriction increases magnetically anisotropic energy in correlation with the internal stresses within the magnetic material of Fe-Si-Al alloy which is a soft magnetic material and that such soft magnetic material exhibits undesirable properties such as increased coercive force (coercivity) and poor permeability, so that it may not produce high output magnetic heads.

The common method of fabricating such metallic thin-film laminated magnetic head involves sputtering a metallic magnetic thin film on a substrate of a non-magnetic material such as glass or the like, laminating such films alternately with insulating layers, and bonding another non-magnetic substrate onto said laminates to sandwich the laminate between the opposed substrates to thereby form a magnetic core. However, studies by the present inventors have revealed that the film formation by sputtering is accompanied by the disadvantage that the substrates on which films have been sputtered are subject to warping due to internal stresses in the films, making it hard to provide uniform bonding throughout the bonding surfaces between the laminate and the substrates.

In the course of studying soft magnetic films of Fe-Si-Al alloy and further thin-film laminated magnetic heads fabricated by laminating soft magnetic films of Fe-Si-Al alloy and non-magnetic insulating films alternately, the present inventors have discovered that the soft magnetic films deposited by sputtering on a substrate has internal stresses generated therein which adversely affect the soft magnetic films, resulting in degrading the properties of the magnetic head. Further analysis of the internal stresses generated in such soft magnetic fills has revealed that such internal stresses arise from not only thermal stresses due to differences in thermal expansion coefficient between the substrates and the fills but also intrinsic stresses which are composed of compressive stresses generated in the films by the high energy particles sputtered from a target by Ar, impacting (peening) and penetrating into the film being deposited and of compressive stresses generated by the argon entrapped in the deposited films.

Furthermore, upon studying and experimenting on methods for relieving the films of internal stresses, the inventors have discovered that compressive stresses ascribed to peening may be removed during the process of heating the deposited magnetic fill up to the heat treatment temperature and that compressive stresses caused by entrapped argon can be controlled by the amount of argon entrapped in the deposited film of Fe-Si-Al alloy within the range from 0.01 to 0.3 percent by weight and using substrates having a thermal expansion coefficient lower than that of the Fe-Si-Al alloy film.

The investors have also found the following factors important in effectively producing magnetic films substantially free from internal stresses:

(1) to employ a DC sputtering apparatus and apply RF bias to the substrate in order to control the amount of argon entrapped in the deposited film, (2) to use for a substrate a material having a thermal expansion coefficient lower than that of a film being deposited on the substrate, and (3) to subject a sputtered magnetic film of Fe-Si-Al alloy to heat treatment at a temperature of 450° C. to 800° C.

The present invention is based on such novel knowledges.

DISCLOSURE OF THE INVENTION

Accordingly, it is an object of the invention to provide a magnetic film of Fe-Si-Al alloy free from the aforesaid problems with the prior art and having internal stresses substantially zeroed and providing good magnetic properties such as low coercivity and high permeability and a method of fabricating such magnetic film.

Another object of the invention is to provide a thin-film laminated magnetic head made from said magnetic film of Fe-Si-Al alloy which has good magnetic properties such as low coercivity and high permeability.

In order to accomplish the foregoing objects, the present invention provides a magnetic film of Fe-Si-Al alloy comprising a substrate and a film of Fe-Si-Al alloy deposited on said substrate characterized in that said substrate has a thermal expansion coefficient lower than that of the film of Fe-Si-Al alloy and that the amount of argon contained in said film is controlled in the range of 0.01 to 0.3 percent by weight so that the internal stresses in said film of Fe-Si-Al alloy is substantially zeroed. Such magnetic film of Fe-Si-Al alloy may be very effectively utilized as a magnetic film for a thin-film laminated magnetic head by laminating such alloy films alternately with non-magnetic insulating films.

In a preferred embodiment of the invention the substrate may have a thermal expansion coefficient of $100 \times 10^{-7}$ to $135 \times 10^{-7}$ °C.$^{-1}$, and the Fe-Si-Al alloy film is a composition having a high saturation magnetization and then containing 83 or more weight % of Fe and have a thermal expansion coefficient of $110 \times 10^{-7}$ to $170 \times 10^{-7}$ °C$^{-1}$. The thickness of the magnetic film is in the range of 1 $\mu$m to 20 $\mu$m.

Crystallized glass (such as PEG 3120 C manufactured by Hoya Co., Ltd.) is suitable as a substrate which satisfies the aforesaid conditions.

The film of Fe-Si-Al alloy to be deposited on the substrate may have a usual composition, but may preferably be a composition having a Fe content of 83 weight percent or more and a higher saturation magnetization as compared with ferrite. Suitable alloys include compositions of 85 wt % Fe, 9.6 wt % Si and 5.4 wt % Al; 88 wt % Fe, 7.7 wt % Si and 4.3 wt % Al; and 90 wt % Fe, 7.8 wt % Si and 2.2 wt % Al, for example.

If the amount of argon entrapped in the magnetic film does not exceed 0.01 wt %, it would be insufficient to relieve tensile stresses caused by the heat treatment. On the contrary if the amount of entrapped argon exceeds 0.3 wt % compressive stresses higher than $10^9$Pa would be generated in the deposited film. It is impossible to reduce such compressive stresses to substantially zero.

As indicated hereinabove, the present inventors have discovered that it is of importance in fabricating the magnetic film of Fe-Si-Al alloy according to the present invention (1) to employ a DC sputtering apparatus and apply RF bias to the substrate, (2) to use for a substrate a material having a therml expansion coefficient lower than that of a film being deposited on the substrate, and (3) to subject a sputtered magnetic film of Fe-Si-Al alloy to heat treatment at a temperature of 450° C. to 800° C.

As stated above, the amount of argon entrapped in the magnetic film is of critical importance in the present invention. Researches by the inventors have shown that when the film formation is performed by RF sputtering, a substantial quantity of argon amounting to as much as over 1 wt % is entrapped in the film if RF bias is applied to the substrate, while about 0.7 to 0.9 wt % of argon is entrapped in the film even with no RF bias applied, so that the amount of entrapped argon cannot be varied in a range effective in controlling the stresses. In addition application of RF bias in the RF sputtering process is impractical because it is difficult to control the phase between the two RF signals.

When the film fabrication is carried out by DC sputtering, an amount of argon below 0.01 wt % is entrapped in the film whether DC bias may be applied or not, so that it is impossible to vary the amount of entrapped argon in a range effective in controlling the stresses.

It is possible to vary the amount of argon required of the soft magnetic film in a range effective in controlling the stresses in the film only by applying RF bias in the DC sputtering process according to the present invention. More specifically, the inventors have discovered that the amount of argon entrapped in the film may be controlled by adjusting the electric power of the DC glow, the RF electric power applied to the substrate holder, and the distance between the substrate and the target, whereby the magnitude of the compressive stresses caused by entrapped argon may be controlled.

The compressive stresses due to the entrapped argon in the thus controlled amount are cancelled by the tensile stresses caused in the deposited film by the difference in thermal expansion between the substrate and the film that is, by using a substrate having a thermal expansion coefficient lower than that of the film being deposited, and further the compressive stresses caused in the deposited film due to peening effect may be removed during the process of heating the film up to the heat treatment temperature, with the result that the soft magnetic film and the thin-film laminated magnetic head fabricated using such soft magnetic film will have their internal stresses substantially zeroed.

BRIEF DESCRIPTION OF THE DRAWINGS

These and other objects and features of the present invention are more fully disclosed in the following specification with reference to the accompanying drawings, in which.

DETAILED DESCRIPTION OF THE EMBODIMENTS OF THE INVENTION

Figure 1:
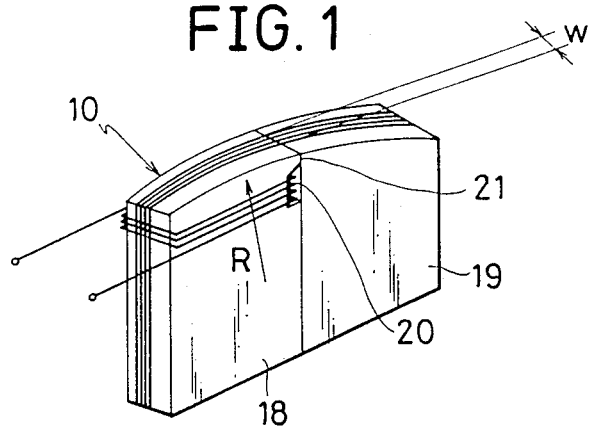
FIG. 1 is a perspective view of an embodiment of the thin-film laminated magnetic head comprising thin films of Fe-Si-Al alloy according to this invention.
Figure 2:
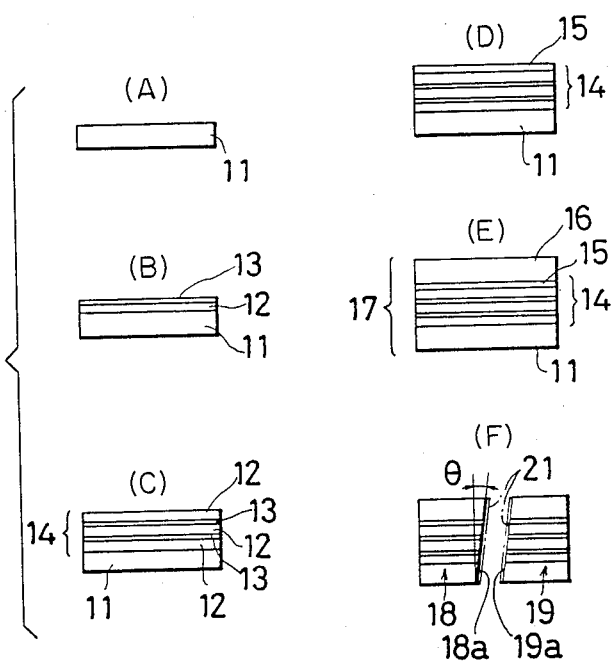
FIG. 2 is a diagrammatic view illustrating the successive steps of one embodiment of the method of fabricating a thin-film laminated magnetic head utilizing thin films of Fe-Si-Al alloy according to this invention.

FIGS. 1 and 2 illustrate an embodiment of thin-film laminated magnetic head 10 and successive steps of a method of fabricating such magnetic head utilizing soft magnetic films of the Fe-Si-Al alloy according to the present invention.

Referring to FIG. 2, a non-magnetic substrate 11 such as crystallized glass or the like is provided as shown in FIG. 2-(A). A thin film of Fe-Si-Al alloy 12 is then deposited on the substrate 11 to a thickness of 1 to 20 $\mu$m under the conditions described hereinabove using a DC magnetron sputtering apparatus, the construction of which will be described later referring to FIG. 3. Next, a non-magnetic insulating film 13 such as SiO₂, Al₂O₃ or the like is deposited on the magnetic film 12 to a thickness of 0.03 to 0.5 μm using a RF magnetron sputtering apparatus similar to that used to deposit the magnetic film 12.

These steps are repeated to laminate a required number of magnetic films 12 and non-magnetic insulating films 13 alternately to form a film laminate 14 as shown in FIG. 2(C). The thickness and number of stacked magnetic films 12 and non-magnetic insulating films 13 are selected appropriately so that the thickness of the film laminate 14 is equal to the track width w shown in FIG. 1.

A bonding material 15 is then deposited on the film laminate 14 by conventional sputtering process as shown in FIG. 2-(D), and another substrate 16 which is made of the same material as that of which the first substrate 11 is made is bonded onto the bonding material 15, as shown in FIG. 2-(E). The bonding material 15 may be bonding glass such as GA-120, FH-11 manufactured by Nippon Electric Glass Co., Ltd. or 1990 available from Corning Corp., and preferably $B_2O_3$-$SiO_2$-$Al_2O_3$ type bonding glass.

The thus produced laminated film structure 17 is cut through the thickness thereof into a pair of core half blocks 18 and 19 as shown in FIG. 2-(F). Preferably the cut is made at an azimuth angle θ. Then, at least one of the core halves, the core half 18 in the illustrated embodiment is formed with grooves 20 (FIG. 1) for receiving a coil winding, followed by polishing the mating surfaces 18a and 19a of the core half blocks 18 and 19 and depositing non-magnetic gap spacers such as SiO₂ or the like on the polished mating surfaces as by sputtering process, as shown in FIG. 2-(F). The two core half blocks 18 and 19 are then bonded together at the mating surfaces 18a, 19a, as shown in FIG. 1.

Finally, R-grinding operation to form tape slide surfaces and other forming operations and coil winding operation are carried out to fabricate a thin-film laminated magnetic head 10.

The invention will now be described with respect to examples.

EXAMPLE 1

Figure 3:
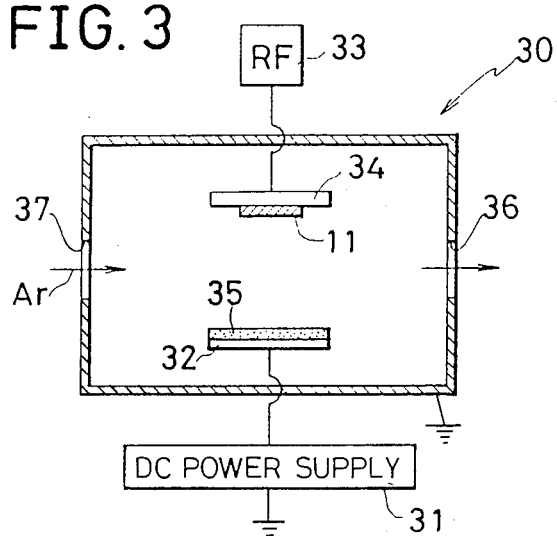
FIG. 3 is a schematic cross-sectional view of a DC magnetron sputtering apparatus used to produce a thin film of Fe-Si-Al alloy according to this invention and a thin-film laminated magnetic head.

FIG. 3 schematically illustrates a DC magnetron sputtering (RF bias applying) apparatus such as model SPF-210 manufactured by ANELVA Corp. The DC sputtering apparatus 30 was provided with a cathode 32 and an electrically isolated substrate holder 34 connected with a high voltage DC power source 31 and a RF bias power source 33, respectively. Disposed on the cathode 32 was a target 35 while a substrate 11 was disposed on the holder 34. The apparatus is further provided with an exhaust port 36 through which the apparatus was evacuated to a vacuum by a vacuum pump (not shown) and an inlet port 37 through which argon gas was introduced into the apparatus.

The target 35 was hot-pressed plate of 4 inches in diameter and 4 mm in thickness composed of 10.5 wt % Si, 5.5 wt % Al and Fe for the balance.

The substrate 11 was a sheet of crystallized glass (PEG3120 manufactured by Hoya Co., Ltd.) having a thermal expansion coefficient of $120 \times 10^{-7}$ °C.$^{-1}$ and a diameter of 2 inches which was polished to a surface roughness of 150Å.

The target 35 and substrate 11 were spaced from each other by a distance of 45 mm. The pressure of argon gas was $4 \times 10^{-3}$ Torr, the electric input power 500 W, the substrate temperature 60° C., and the film deposition rate 0.4 μm/min.

Under the foregoing operating conditions, a film of Fe-Si-Al alloy was deposited on the substrate to a thickness of 4 μm while RF electric power was applied to the holder varying in the range of 0 to 0.6 KV in terms of the plate voltage of the oscillating tube for use with a RF power source. The thus formed soft magnetic film was then heat treated at a temperature of 650° C. for one hour.

Figure 4:
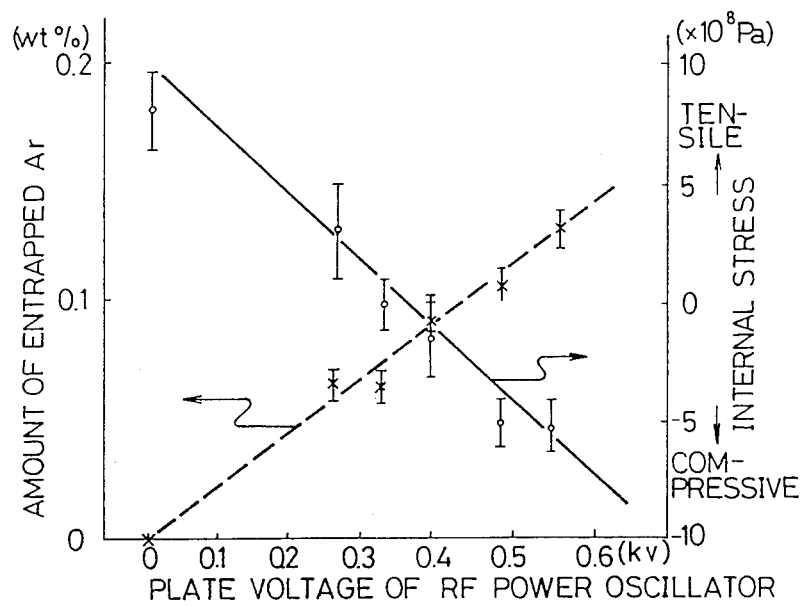
FIG. 4 is a graph showing the relationship between the internal stresses in a soft magnetic film of Fe-Si-Al alloy according to this invention, the amount of entrapped argon and the RF bias.
Figure 5:
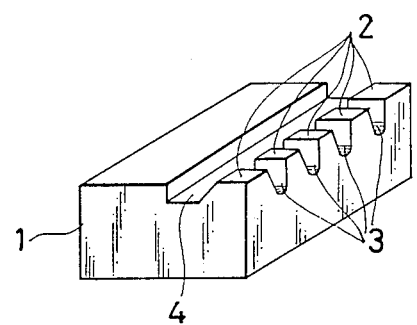
FIG. 5 is a perspective view of a core member from which a conventional magnetic head is made.

The thus prepared film of Fe-Si-Al alloy had a thermal expansion coefficient of $110 \times 10^{-17}$ to $170 \times 10^{-7}$ °C.$^{-1}$, and the relation between the internal stresses in said soft magnetic film, the amount of argon entrapped and the RF electric power is as shown in FIG. 4.

It will be seen from the graph of FIG. 4 that there is a direct proportional relation between the amount of entrapped argon and the compressive stresses and that it is possible to change the internal stresses from tensile to compressive stresses since the amount of entrapped argon is in proportion to the plate voltage of the RF power oscillating tube. In this example, when the plate voltage was 0.35 KV, the internal stresses in the deposited film were below $\pm 1 \times 10^8$ Pa, and the film provided magnetic properties such as coercivity of 0.16 Oe and effective specific initial permeability of 2000.

EXAMPLE 2

A film 12 of Fe-Si-Al alloy was deposited on a substrate 11 to a thickness of 4.7 μm using the same DC magnetron sputtering apparatus, substrate and target 35 as used in Example 1 and under the same operating conditions.

The thus formed film of Fe-Si-Al alloy had a thermal expansion coefficient of $110 \times 10^{-7}$ to $170 \times 10^{-7}$ °C.$^{-1}$, and the relation between the internal stresses in said soft magnetic film, the amount of argon entrapped in the film and the RF electric power is as shown as in FIG. 4. In this example when the plate voltage of the oscillating tube was 0.35 KV, the internal stresses in the deposited film were below $\pm 1 \times 10^8$ Pa.

An insulating film 13 was then formed on the Fe-Si-Al alloy film 12. The formation of the insulating film was performed using the same magnetron sputtering apparatus as used to form the Fe-Si-Al alloy film but with the apparatus connected to a RF power source and with a plate of SiO₂ of 4 inches in diameter and 5 mm in thickness used as a target. The target and the substrate having the magnetic film deposited thereon were spaced from each other by a distance of 45 mm. The pressure of argon was $4 \times 10^{-3}$ Torr, the input electric power 300 W, the substrate temperature 60° C. and the deposition rate 0.1 μm/min. The SiO₂ film was deposited in a thickness of 0.3 μm on the magnetic film formed on the substrate under these conditions.

The aforesaid steps of depositing the magnetic film 12 and insulating film 13 were repeated four times to produce a film laminate 14 having a total thickness of 20 μm. A bonding material 15 which was FH-11 made by Nippon Electric Glass Co., Ltd. in this example was deposited on said film laminate 14 as by conventional sputtering process, and then another substrate 16 made of the same material as the first substrate 11 was applied to the bonding material 15 to fabricate a laminated film structure 17. Subsequently, the laminated film structure 17, that is, the magnetic films 12 of the film laminate 14 are subjected to heat treatment at 650° C. for one hour.

The thus formed Fe-Si-Al alloy/SiO$_2$ laminated soft magnetic film system had internal stresses therein below $\pm 1 \times 10^8$ Pa. It was determined by experiments that the thus formed laminated soft magnetic film had internal stresses below $\pm 1 \times 10^8$ Pa for the total thickness of 3 to 40 μm.

With regard to the magnetic properties the laminated film structure 17 provided a coercivity of 0.18 Oe and a specific initial permeability of 2000. This laminated film structure was worked on according to the process as shown in FIG. 2-(F) to fabricate a VCR magnetic head as shown in FIG. 1 having its track with extending in the direction of the film thickness. This magnetic head was evaluated for its read/write characteristics. The parameters of the heads, the measuring conditions and the maximum outputs at various frequencies are shown in the following Tables 1, 2 and 3, respectively.

TABLE 1

| (parameters of the head) | | | | |
|---|---|---|---|---|
| Track width | Gap length | Gap depth | Number of coil turns | Inductance |
| 20 μm | 0.25 μm | 25 μm | 24 | 1.5 μH at 5 MHz |

TABLE 2

| (measuring conditions) | | | |
|---|---|---|---|
| Relative velocity | Magnetic recording media | | |
| | Remanence | Coercivity | |
| 5.8 m/sec | 2400 G | 1450 Oe | Coated metal powder tape |

TABLE 3

| (results measured) | | | | |
|---|---|---|---|---|
| MHz | 1 | 2 | 5 | 7 | 10 |
| μVp-P | 560 | 610 | 450 | 350 | 180 |

From the Table 3 it is to be appreciated that in comparison at the standardized output at 5 MHz the maximum reproducing output of the Fe-Si-Al alloy thin-film laminated magnetic head according to the present invention is about 3 times as great as that of the conventioanl single crystal Mn-Zn ferrite head used, for the VHS video cassette recorder.

The method for introducing argon gas is not limited to the method illustrated in the examples, but argon gas may be ion-inplanted directly into a film being sputtered, or alternatively the combination of vacuum deposition and ion-inplantation methods or any other suitable method may be used.

Further, it is to be understood that the thin film of Fe-Si-Al alloy according to the present invention is not limited to the use for a magnetic head, but may also be effectively utilized for thin-film inductors, magnetic shielding films and the like.

While the magnetic head constructed from the Fe-Si-Al alloy thin film according to this invention is described as a VCR magnetic head in the illustrated embodiment, the present invention is not to be limited to it but is equally applicable to the heads of disk files and the like.

As is explained hereinabove, the thin film of Fe-Si-Al alloy according to this invention substantially zeroes internal stresses of a metallic magnetic film, thereby providing a significantly increased initial permeability, and may be very effectively employed as a magnetic film for a high performance thin-film laminated magnetic head or other magnetic devices having a greatly increased reproducing output as compared with the prior art. Further, according to the method of this invention, such thin film of Fe-Si-Al alloy, and hence a thin-film laminated magnetic head may be very conveniently manufactured.

What is claimed is:

1. A method of producing a magnetic film of Fe-Si-Al alloy, characterized by using a DC sputtering apparatus to apply RF bias to a substrate and to deposit a Fe-Si-Al alloy film on said substrate, said alloy film having a thermal expansion coefficient of $110 \times 10^{-7}$ to $170 \times 10^{-7}$ °C.$^{-1}$ and said substrate having a thermal expansion coefficient of $100 \times 10^{-7}$ to $135 \times 10^{-7}$ °C.$^{-1}$, and the amount of argon entrapped in said alloy film being controlled within range of 0.01 to 0.3 wt % so as to substantially zero the internal stesses in said alloy film.

2. The method according to claim 1 wherein said Fe-Si-Al alloy film is a composition containing 83 to 94 wt % Fe, 4 to 11 wt % Si and 2 to 6 wt % Al and having a high level of saturation magnetization.

3. The method according to claim 1 or 2 wherein said substrate is made of crystallized glass.

* * * * *